(12) United States Patent
Howe

(10) Patent No.: US 8,655,775 B1
(45) Date of Patent: Feb. 18, 2014

(54) METHOD AND SYSTEM FOR MERCHANT DEBIT ROUTING TABLE CHANGE DETECTION

(71) Applicant: MasterCard International Incorporated, Purchase, NY (US)

(72) Inventor: Justin Xavier Howe, Oakdale, NY (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 13/763,182

(22) Filed: Feb. 8, 2013

(51) Int. Cl.
*G06Q 40/00* (2012.01)

(52) U.S. Cl.
USPC ............................................. 705/39; 705/40

(58) Field of Classification Search
USPC ...................................................... 705/10–44
See application file for complete search history.

(56) References Cited

U.S. PATENT DOCUMENTS

| | | | | |
|---|---|---|---|---|
| 6,381,640 | B1 * | 4/2002 | Beck et al. ..................... | 709/223 |
| 7,286,512 | B1 * | 10/2007 | Borella .......................... | 370/338 |
| 7,373,644 | B2 * | 5/2008 | Aborn ........................... | 718/105 |
| 2004/0169675 | A1 * | 9/2004 | Beck et al. .................... | 345/705 |
| 2004/0221296 | A1 * | 11/2004 | Ogielski et al. ................ | 719/313 |
| 2006/0153173 | A1 * | 7/2006 | Beck et al. .................... | 370/352 |
| 2009/0296710 | A1 * | 12/2009 | Agrawal et al. ................ | 370/392 |
| 2012/0197795 | A1 * | 8/2012 | Campbell et al. .............. | 705/42 |
| 2012/0290479 | A1 * | 11/2012 | Hoke et al. ..................... | 705/44 |
| 2012/0290716 | A1 * | 11/2012 | Ogielski et al. ................ | 709/224 |

* cited by examiner

*Primary Examiner* — Frantzy Poinvil
(74) *Attorney, Agent, or Firm* — Buchanan Ingersoll & Rooney PC

(57) ABSTRACT

A method for identifying a merchant debit routing table includes: storing a plurality of transaction data entries, each entry including a first and second debit network, a utilized network, a merchant identifier, and a transaction date, the utilized network being the first or second debit network; receiving a routing identification request, the request including a merchant identification; identifying a merchant transaction group, the group including entries where the merchant identifier corresponds to the merchant identification; identifying a plurality of network subgroups in the group, each subgroup including entries including a common first and second debit network; identifying, for each subgroup, a preferred network based on the utilized network for each entry in the subgroup where the transaction date is a specific date; and identifying a routing table for a merchant associated with the merchant identifier based on the preferred network and the first and second debit network for each subgroup.

26 Claims, 10 Drawing Sheets

METHOD AND SYSTEM FOR MERCHANT DEBIT ROUTING TABLE CHANGE DETECTION

FIELD

The present disclosure relates to the detection of merchant debit routing tables, specifically the detection of merchant debit routing tables based on available debit card routing networks and debit transaction routing history.

BACKGROUND

Debit cards are traditionally eligible for processing using one of two, or sometimes more, debit networks. When a consumer uses a debit card to fund a financial transaction, the merchant is often responsible for selecting which eligible debit network is to be used for processing. Merchants many times select a debit network based on the expense charged by the network for processing the transaction and for the routing of the transaction to the network itself. In some instances, a merchant may select a network based on convenience. Due to the volume of debit transactions for many retailers, merchants typically use a routing table, which sets a priority debit networks to be used, such that the highest (most preferred) debit network is always used if available, and continuing down to the first available network if the highest or next highest is unavailable.

Accordingly, many debit networks may desire to identify their position in a merchant's routing table. However, pricing structures and circumstances frequently change, which many times result in merchants and retailers modifying their routing table accordingly. For merchants that process debit transactions funded by debit cards associated with a large number of different debit networks, pricing structures and network configurations may change frequently. This may result in a debit routing table that changes the order of its network preferences often. Therefore, while a debit network may eventually discover their position in a merchant's routing table, such information may become outdated as soon as a merchant makes a modification to their table.

Thus, there is need for a technical solution to detecting changes in a merchant's debit routing table.

SUMMARY

The present disclosure provides a description of a systems and methods for the identification of merchant debit routing tables.

A method for identifying a merchant debit routing table includes: storing, in a database, a plurality of transaction data entries, wherein each transaction data entry includes data related to a financial transaction and includes at least a first debit network, a second debit network, a utilized debit network, a merchant identifier, and a transaction date, the utilized debit network being the first debit network or the second debit network; receiving, by a receiving device, a routing identification request, wherein the routing identification request includes at least a merchant identification; identifying, by a processing device, a merchant transaction group, wherein the merchant transaction group includes transaction data entries of the plurality of transaction data entries where the included merchant identifier corresponds to the merchant identification; identifying, by a processing device, a plurality of network subgroups in the merchant transaction group, wherein each network subgroup includes transaction data entries included in the merchant transaction group including a common first debit network and a common second debit network; identifying, for each network subgroup of the plurality of network subgroups, a preferred debit network based on the utilized debit network for each transaction data entry in the network subgroup where the transaction date is a specific date; and identifying, by the processing device, a routing table for a merchant associated with the merchant identifier based on the preferred debit network and the first debit network and the second debit network for each network subgroup of the plurality of network subgroups.

Another method for identifying a merchant debit routing table includes: storing, in a database, a plurality of transaction data entries, wherein each transaction data entry includes data related to a financial transaction and includes at least a first debit network, a second debit network, a utilized debit network, a merchant identifier, and a transaction date, the utilized debit network being the first debit network or the second debit network; receiving, by a receiving device, a routing identification request, wherein the routing identification request includes at least a merchant identification; identifying, by a processing device, a merchant transaction group, wherein the merchant transaction group includes transaction data entries of the plurality of transaction data entries where the included merchant identifier corresponds to the merchant identification; identifying, by a processing device, a plurality of network subgroups in the merchant transaction group, wherein each network subgroup includes transaction data entries included in the merchant transaction group including a common first debit network and a common second debit network; identifying, for each date of a predetermined range of dates, a preferred debit network for each network subgroup of the plurality of network subgroups based on the utilized debit network for each transaction data entry in the network subgroup where the transaction date is a specific date; identifying, for each date of the predetermined range of dates, a routing table for a merchant associated with the merchant identifier based on the preferred debit network and the first debit network and the second debit network for each network subgroup of the plurality of network subgroups for the respective date of the predetermined range of dates; and identifying, by the processing device, a change in debit routing for the merchant based on the routing table for the merchant for each date of the predetermined range of dates.

A system for identifying a merchant debit routing table includes a database, a receiving device, and a processing device. The database is configured to store a plurality of transaction data entries, wherein each transaction data entry includes data related to a financial transaction and includes at least a first debit network, a second debit network, a utilized debit network, a merchant identifier, and a transaction date, the utilized debit network being the first debit network or the second debit network. The receiving device is configured to receive a routing identification request, wherein the routing identification request includes at least a merchant identification. The processing device is configured to: identify a merchant transaction group, wherein the merchant transaction group includes transaction data entries of the plurality of transaction data entries where the included merchant identifier corresponds to the merchant identification; identify a plurality of network subgroups in the merchant transaction group, wherein each network subgroup includes transaction data entries included in the merchant transaction group including a common first debit network and a common second debit network; identify, for each network subgroup of the plurality of network subgroups, a preferred debit network based on the utilized debit network for each transaction data entry in the network subgroup where the transaction date is a specific date; and identify a routing table for a merchant associated with the merchant identifier based on the preferred debit network and the first debit network and the second debit network for each network subgroup of the plurality of network subgroups.

Another system for identifying a merchant debit routing table includes a database, a receiving device, and a processing device. The database is configured to store a plurality of transaction data entries, wherein each transaction data entry includes data related to a financial transaction and includes at least a first debit network, a second debit network, a utilized debit network, a merchant identifier, and a transaction date, the utilized debit network being the first debit network or the second debit network. The receiving device is configured to receive a routing identification request, wherein the routing identification request includes at least a merchant identification. The processing device is configured to: identify a merchant transaction group, wherein the merchant transaction group includes transaction data entries of the plurality of transaction data entries where the included merchant identifier corresponds to the merchant identification; identify a plurality of network subgroups in the merchant transaction group, wherein each network subgroup includes transaction data entries included in the merchant transaction group including a common first debit network and a common second debit network; identify, for each date of a predetermined range of dates, a preferred debit network for each network subgroup of the plurality of network subgroups based on the utilized debit network for each transaction data entry in the network subgroup where the transaction date is a specific date; identify, for each date of the predetermined range of dates, a routing table for a merchant associated with the merchant identifier based on the preferred debit network and the first debit network and the second debit network for each network subgroup of the plurality of network subgroups for the respective date of the predetermined range of dates; and identify a change in debit routing for the merchant based on the routing table for the merchant for each date of the predetermined range of dates.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Definition of Terms

Debit Network—A system or network used for the transfer of money via the use of a debit card. Debit networks may use a variety of different protocols and procedures in order to process the transfer of money for various types of debit transactions. Debit networks may charge processing fees or other types of fees for the processing of a debit transaction to a merchant or acquirer from which the debit transaction is routed. Examples of networks or systems configured to perform as debit networks include Maestro, ACCEL, Interlink, MAC, MoneyPass, Pulse, SHAZAM, STAR, etc.

Payment Account—A financial account that may be used to fund a transaction, such as a checking account, savings account, credit account, virtual payment account, etc. A payment account may be associated with an entity, which may include a person, family, company, corporation, governmental entity, etc. In some instances, a payment account may be virtual, such as those accounts operated by PayPal®, etc.

Debit Card—A card or data associated with a payment account that may be provided to a merchant in order to fund a financial transaction via the associated payment account. A debit card may be a physical card that may be provided to a merchant, or may be data representing the associated payment account (e.g., as stored in a communication device, such as a smart phone or computer). For example, in some instances, data including a payment account number may be considered a debit card for the processing of a transaction funded by the associated payment account. A debit card may differ from other types of payment cards (e.g., a credit card) in networks that are used to process transactions involving the card and that, for debit card transactions, funds are immediately transferred from the corresponding payment account to fund the transaction.

System for Identifying Merchant Debit Routing Tables

Figure 1:
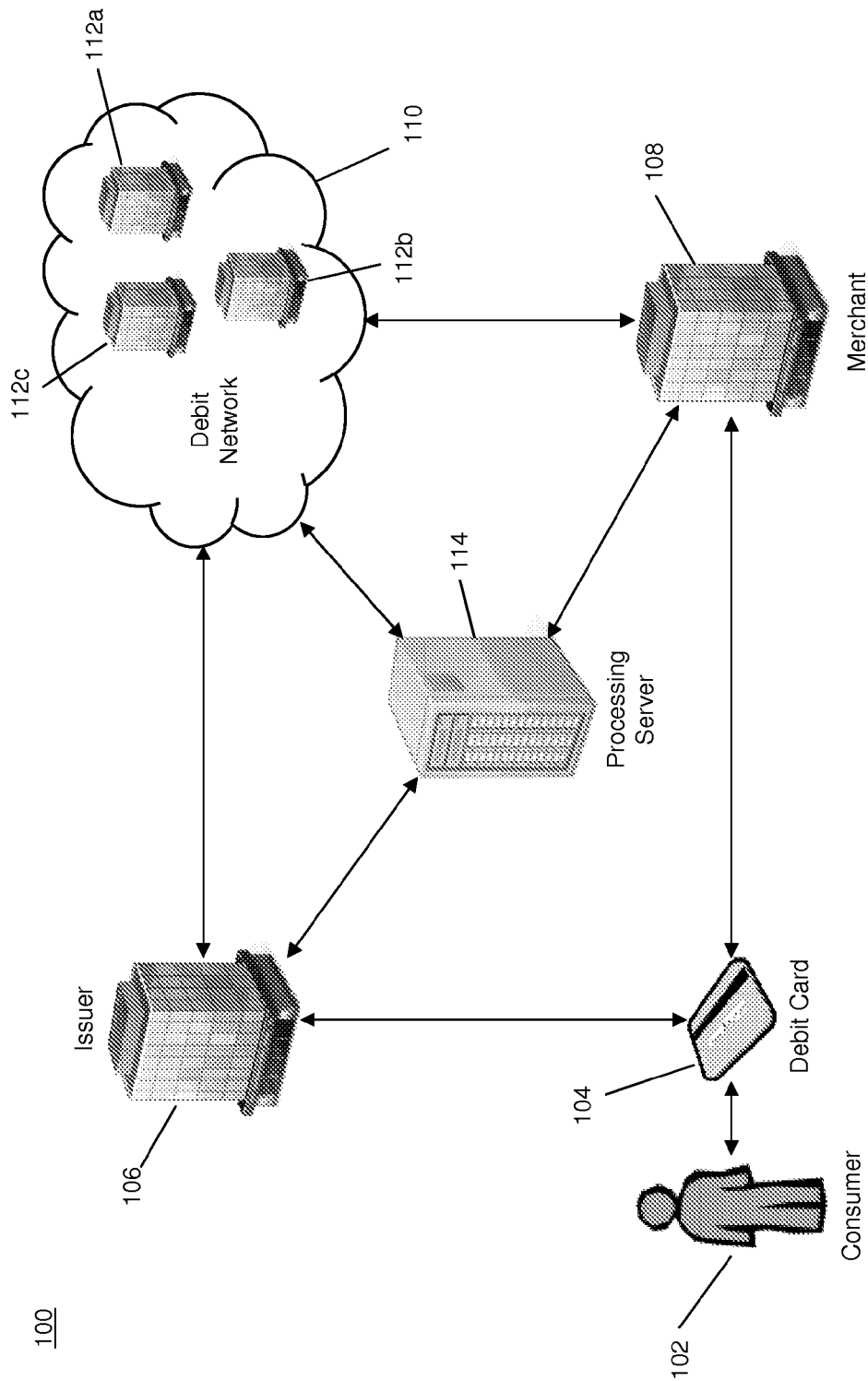
FIG. 1 is a high level architecture illustrating a system for the identification of merchant debit routing tables and changes therein.

FIG. 1 is a block diagram illustrating a system 100 for identifying merchant debit routing tables and identifying changes in merchant debit routing tables.

The system 100 may include a consumer 102. The consumer 102 may have a debit card 104 issued to the consumer 102 by an issuer 106, such as an issuing bank. The consumer 102 may have a payment account with the issuer 106, and the debit card 104 may be associated with that payment account. The consumer 102 may use the debit card 104 at a merchant 108 to fund a financial transaction. As used herein, the term "merchant" may refer to an entity (e.g., a person, company, partnership, holding company, etc.) with which the consumer 102 may transact, may refer to a specific location (e.g., a physical location at which the consumer transacts), or may refer to a point-of-sale system used to conduct (e.g., enter, initiate, process, finalize, etc.) the financial transaction. The merchant 108 may enter transaction information and the payment details (e.g., card details of the debit card 104) into the point of sale, and the merchant 108, or an acquirer (e.g., an acquiring bank) on behalf of the merchant 108, may submit an authorization request for the financial transaction to a debit network 110.

The debit network 110 may include one or more debit processor 112, illustrated as debit processors 112a, 112b, and 112c. Each debit processor 112 may operate an independent debit network 110. In some instances, the financial transaction may be routed to more than one debit network 110 such that the financial transaction is processed by multiple debit processors 112. The debit processor 112 may process the financial transaction funded by the debit card 104 using methods that will be apparent to persons having skill in the relevant art. Such methods may include transmitted relevant transaction information (e.g., the account number corresponding to the debit card 104, transaction amount, etc.) to the issuer 106, which may identify the payment account associated with the debit card 104 and may return approval or denial to the debit processor 112 based on the transaction amount and a balance of the payment account.

The debit processor 112 may transmit an authorization response to the merchant 108 and/or an acquirer via the debit network 110. The merchant 108 may then finalize the transaction based on the authorization response, such as by providing transacted for goods and/or services to the consumer 102 upon approval of the transaction, or notifying the consumer 102 of denial of the transaction.

In some embodiments, the debit card 104 may be associated with two or more debit processors 112. In such an embodiment, the merchant 108 may submit an authorization request for the financial transaction to only those debit processors 112 associated with the debit card 104. The merchant 108 (e.g., the point-of-sale system operated by the merchant 108) may include a routing table, discussed in more detail below. The routing table may indicate a priority of preference between debit processors 112, such that the merchant 108 may submit the authorization request to the debit processor 112 and debit network 110 with the highest priority in the routing table.

The system may also include a processing server 114. The processing server 114 may be configured to store transaction data for a plurality of financial transactions, as discussed in more detail below. In some embodiments, the processing server 114 may be a debit processor 112 and may operate a debit network 110. In such an embodiment, the processing server 114 may store transaction data for only those financial transactions processed by the processing server 114. In some instances, the processing server 114 may receive transaction data for financial transactions processed by other or multiple debt processors 112. The processing server 114 may be configured to identify the debit routing table for the merchant 108 based on the stored transaction data using methods as discussed below.

Processing Server

Figure 2:
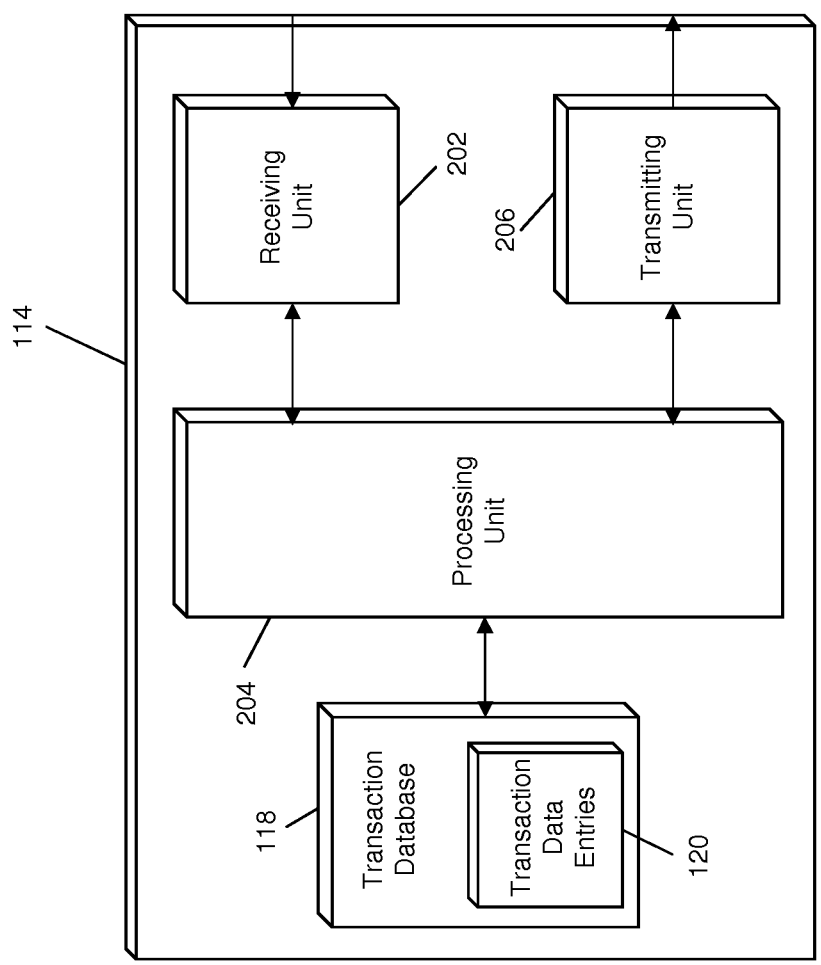
FIG. 2 is a block diagram illustrating an embodiment of a processing server for use in the system of FIG. 1 in accordance with exemplary embodiments.

FIG. 2 illustrates an embodiment of the processing server 114 of the system 100. It will be apparent to persons having skill in the relevant art that the embodiment of the processing server 114 illustrated in FIG. 2 is provided as illustration only and may not be exhaustive to all possible configurations of the processing server 114 suitable for performing the functions as discussed herein. For example, the computer system 1000 illustrated in FIG. 10 and discussed in more detail below may be a suitable configuration of the processing server 114.

The processing server 114 may include a receiving unit 202. The receiving unit 202 may be configured to receive a routing identification request including at least one merchant identification (e.g., associated with the merchant 108). The processing server 114 may also include a processing unit 204, which may be configured to identify the merchant identification included in the routing identification request, and then may further identify a group of transaction data entries 120 in a transaction database 118 associated with financial transactions involving the merchant 108 associated with the merchant identification.

The transaction data entries 120, discussed in more detail below with reference to FIG. 3, may include at least a first debit network and a second debit network, and may further indicate a utilized debit network (e.g., debit network used for processing the associated financial transaction). The processing unit 204 may be configured to identifying, in the group of transaction data entries 120, a plurality of network subgroups, wherein the transaction data entries in each network subgroup includes a common first debit network and a common second debit network. The processing unit 204 may then identify, for each network subgroup, a preferred debit network based on the indicated utilized debit network. Based on the identified preferred debit networks for each network subgroup, the processing unit 204 may then identifying a routing table for the merchant 108.

The processing server 114 may further include a transmitting unit 206. The transmitting unit 206 may be configured to transmit the identified merchant routing table in response to the routing identification request. In some embodiments, the processing unit 204 may identify a routing table for the merchant 108 for each date of a specific listing of dates or period of time, and may further detect a change in the merchant routing table based on the identified routing tables. Such a method, illustrated in more detail and discussed below with respect to FIGS. 4-7, may enable the processing server 114 to easily detect changes in a merchant routing table. In some instances, the processing server 114 may identify a routing table for the merchant 108 each day based on transaction data entries 120 related to transactions initiated on that business day or the preceding business day, which may enable the processing server 114 to identify a change in a routing table on or within close proximity to the day it occurs.

Transaction Database

Figure 3:
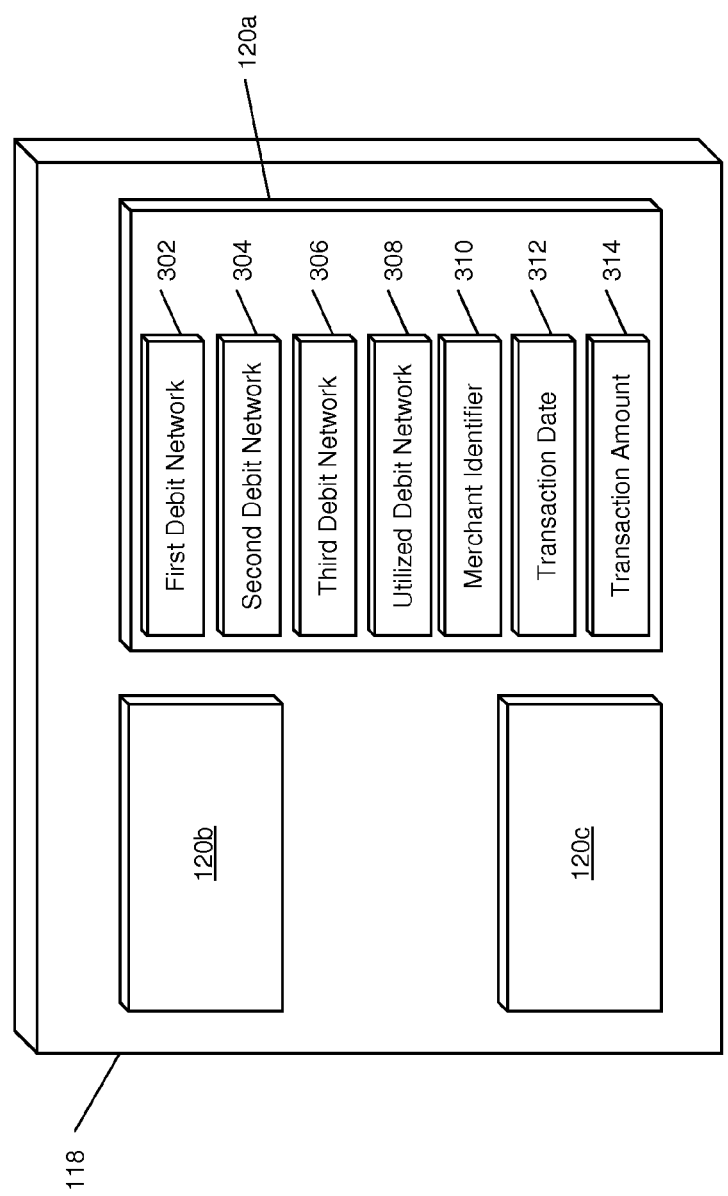
FIG. 3 is a block diagram illustrating a transaction database of the processing server of FIG. 2 in accordance with exemplary embodiments.

FIG. 3 is an illustration of the transaction database 118. The transaction database 118 may include a plurality of transaction data entries 120, illustrated in FIG. 3 as transaction data entries 120a, 120b, and 120c. Each transaction data entry 120 may include data related to a financial transaction and may include at least a first debit network 302, a second debit network 304, a utilized debt network 308, a merchant identifier 310, and a transaction date 312.

The first debit network 302 and the second debit network 304 may correspond to a first and second debit network 110 for which the debit card (e.g., the debit card 104) used in the related financial transaction is eligible for processing. In some instances, the debit card 104 may include a third debit network 306, which may be a third debit network 110 eligible for processing of the debit transaction involving the debit card 104.

The utilized debit network 308 may be the debit network 110 used to process the related financial transaction. It will be apparent to persons having skill in the relevant art that the utilized debit network 308 in a transaction data entry 120 will be one of the first debit network 302, second debit network 304, or, in instances where one or more may be included, the third or fourth, etc., debit network 306. In some embodiments, such as where the processing server 114 may be part of or associated with a debit network 110, the transaction data entries 120 included in the transaction database 118 may all include the same utilized debit network 308 (e.g., which may be the debit network 110).

The merchant identifier 310 may be a unique value identifying a merchant (e.g., the merchant 108) involved in the related financial transaction. Values suitable for use as the merchant identifier 310 will be apparent to persons having skill in the relevant art, such as a merchant identification number (MID). The merchant identifier 310 may be used in order to identify a group of transaction data entries 120 related to financial transactions involving the same merchant 108, for use in identifying the routing table for the involved merchant 108. The transaction date 312 may be the date on which the related financial transaction was processed. It will be apparent to persons having skill in the relevant art that the transaction date 312 may correspond to the date of authorization of the financial transaction, clearing of the financial transaction, or any other point in the processing cycle of a financial transaction suitable for use in identifying a merchant routing table.

In some embodiments, a transaction data entry 120 may further include a transaction amount 314. The transaction amount 314 may be used to separate the transaction data entries 120 into further subgroups (e.g., as discussed in more detail below) to identify multiple routing tables for a single merchant 108 dependent on transaction amount. For example, due to complex pricing structures, the merchant 108 may have a first routing table for all transactions under five dollars, and may have a second routing table for all transactions five dollars or more. In some embodiments, the transaction amount 314 may be a transaction amount category (e.g., five dollars or less, between five and ten dollars, between ten and twenty dollars, etc.).

Identification of a Merchant Routing Table

FIGS. 4-7 illustrate exemplary data sets of transaction data entries 120 in the transaction database 118 for use by the processing unit 204 in the identification of a merchant routing table for a specific merchant (e.g., the merchant 108).

Figure 4:
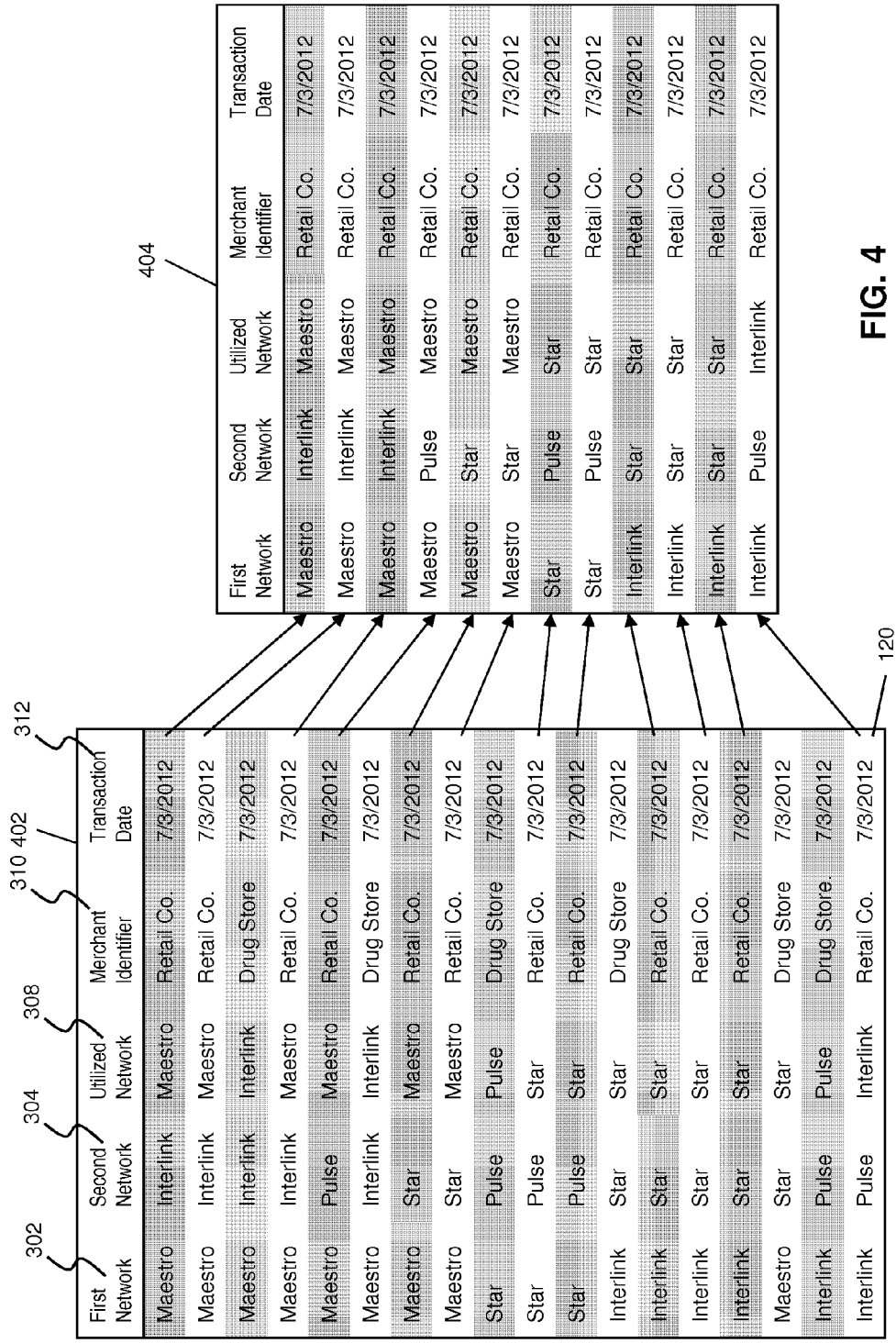
FIGS. 4-6 are diagrams illustrating an example data set of the transaction database of FIG. 3 and a method for identifying a merchant debit routing table using the data set in accordance with exemplary embodiments.

In order to identify a merchant routing table for a specific date, the processing unit 204 of the processing server 114 may identify a transaction dataset 402 for all transaction data entries 120 in the transaction database 118 where the transaction date 312 is the specific date. As illustrated in FIG. 4, the transaction dataset 402 may include all transaction data entries 120 where the transaction date 312 is Jul. 3, 2012.

The processing unit 204 may identify, from the transaction dataset 402, a merchant transaction group 404. The merchant transaction group 404 may include all those transaction data entries 120 where the merchant identifier 310 is a specific merchant identifier, such as a merchant identification received in a routing identification request. In instances where the transaction dataset 402 may include transaction data entries 120 including a plurality of transaction dates 312, the processing unit 204 may identify the merchant transaction group 404 of transaction data entries 120 including both a common merchant identifier 310 and transaction date 312, such as included in a routing identification request, which may result in the merchant transaction group 404 illustrated in FIG. 4.

Figure 5:
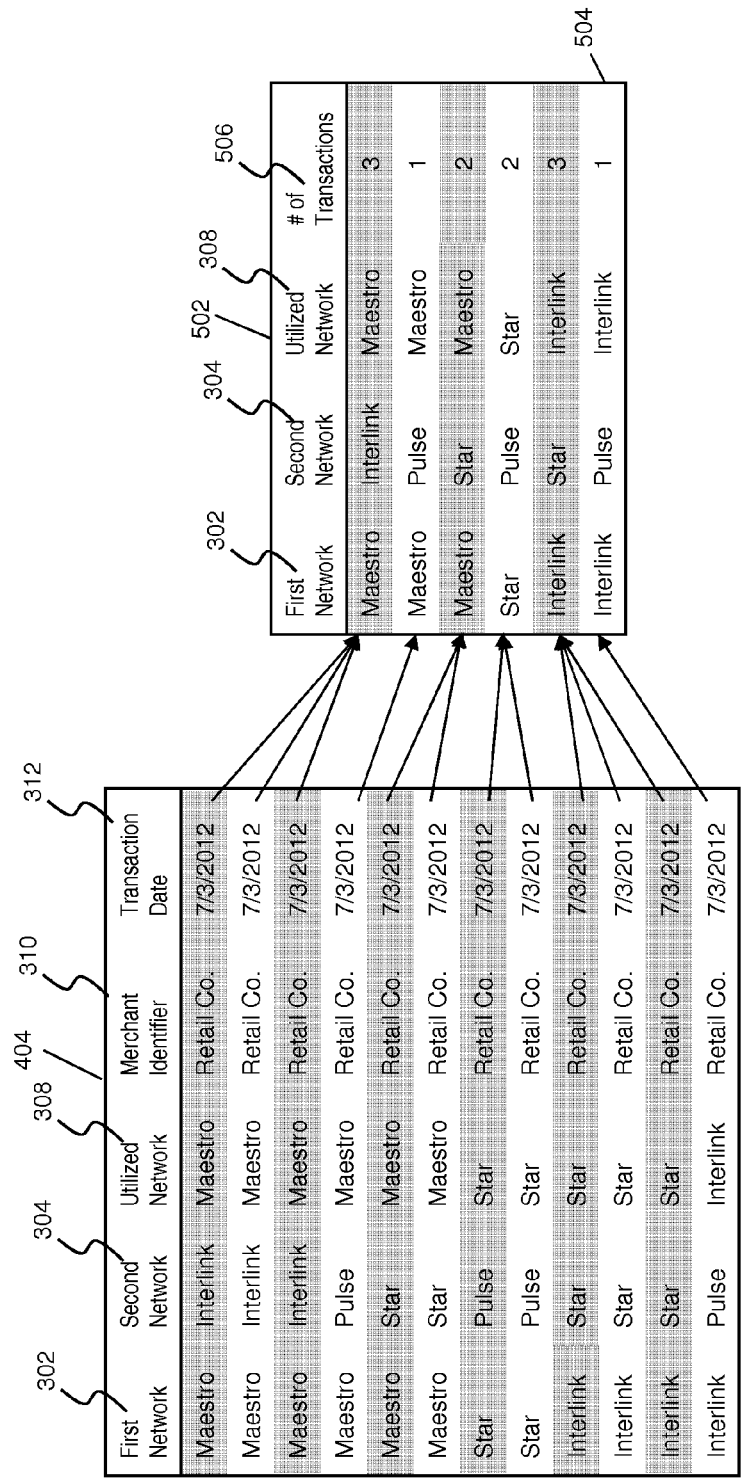

The processing unit 204 may then identify a plurality of network subgroups 502 from the merchant transaction group 404, as illustrated in FIG. 5. The plurality of network subgroups 502 may include network subgroups 504 wherein each network subgroup 504 includes transaction data entries 120 including a common first debit network 302 and second debit network 304. It will be apparent to persons having skill in the relevant art that, in most instances, each network subgroup 504 will include a common utilized debit network 308. In instances where a merchant 108 may include multiple routing tables (e.g., based on transaction amount 314), then each network subgroup 504 may include multiple utilized debit networks 308, as discussed in more detail below. In some embodiments, each network subgroup 504 may further include a number 506 of transaction data entries 120 included in the network subgroup.

It will be further apparent to persons having skill in the relevant art that, in some instances, such as where the processing server 114 may be included in or associated with a specific debit processor 112 or debit network 110, the network subgroups 504 may each include the specific debit network 110 corresponding to the specific debit processor 112 as the utilized debit network 308. In such instances, the first debit network 302 or the second debit network 304 (e.g., or the third debit network 306 in instances where the debit cards 104 used in transactions in a network subgroup 504 have at least three eligible debit networks 110) may be the specific debit network 110. It will be apparent to persons having skill in the relevant art that such data may not preclude the processing server 114 from identifying the merchant routing table.

Figure 6:
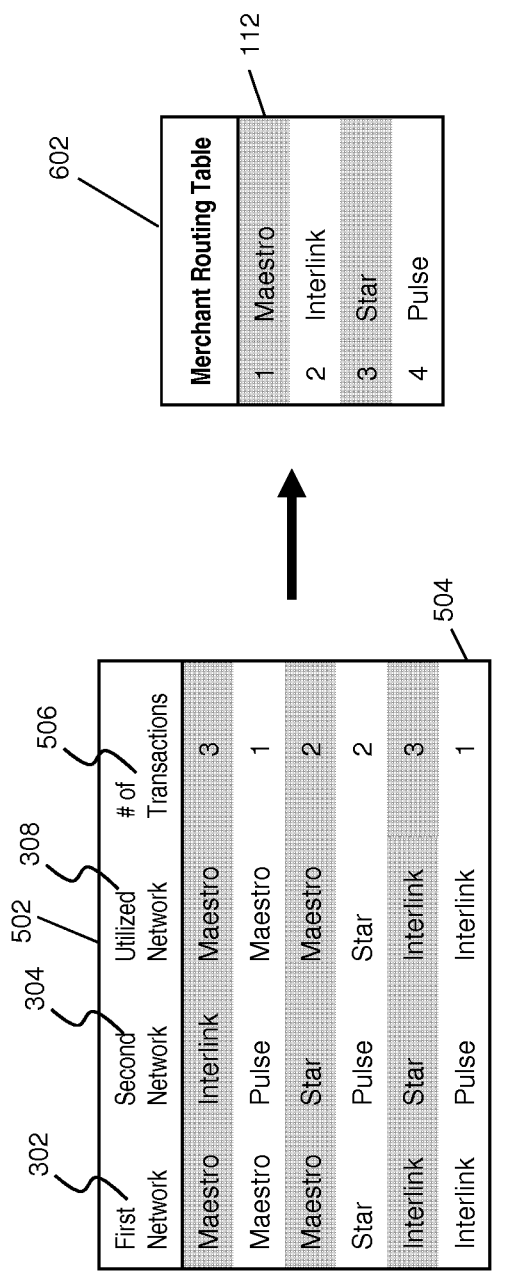

The processing unit 204 may then use the plurality of network subgroups 502 to identify a merchant routing table 602 for the merchant 108, as illustrated in FIG. 6. The merchant routing table 602 may include a plurality of debit processors 112 listed in order of the preference of the merchant 108 in routing debit transactions. The merchant routing table 602 may be ordered based on the utilized debit network 308 for each network subgroup 504 of the plurality of network subgroups 502, along with the first debit network 302 and the second debit network 304 for the network subgroup 504. For example, as illustrated in FIG. 6, in each instance where Maestro is an eligible debit processor 112, it is also the utilized debit network 308. Accordingly, it is placed first in the merchant routing table 602. Star is utilized over Pulse in the respective network subgroup, so it is above Pulse in the merchant routing table 602. However, as Interlink is the utilized debit network 308 in instances where Star and Interlink are the first 302 and second 304 debit networks, Interlink is ahead of star in the merchant routing table 602.

Figure 7:
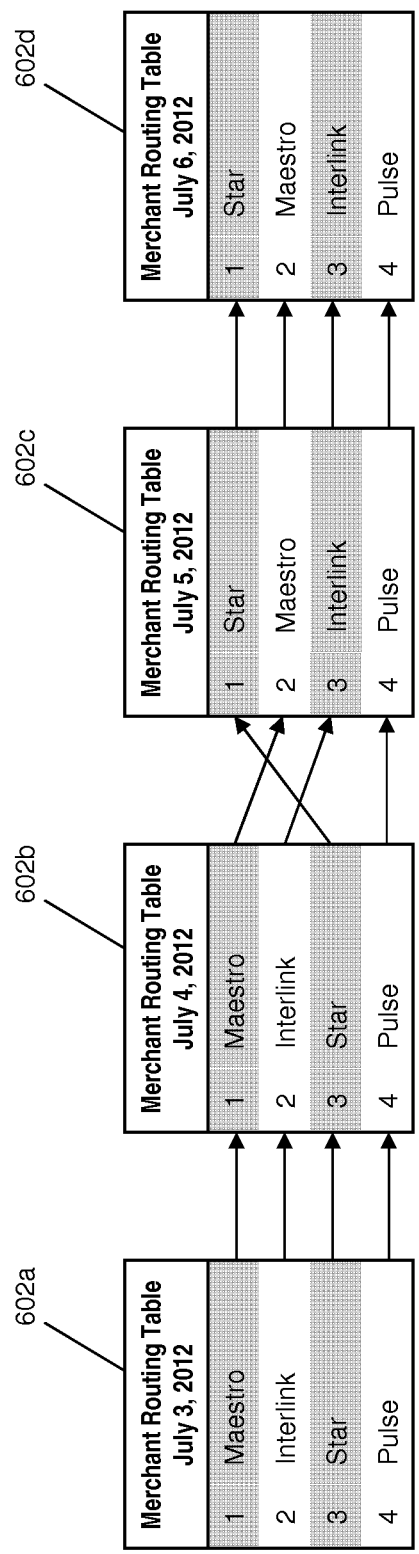
FIG. 7 is a diagram illustrating identification of changes in a merchant debit routing table in accordance with exemplary embodiments.

In some embodiments, the processing unit 204 may be configured to identify a merchant routing table 602 for multiple transaction dates 312. For example, the processing unit 204 may identify merchant routing tables 602 for each of four consecutive transaction dates 312, as illustrated in FIG. 7 as merchant routing tables 602a, 602b, 602c, and 602d. In the illustrated example, the processing unit 204 may identify that the merchant routing table 602c is different from the merchant routing table 602b. Accordingly, the processing unit 204 may identify that the merchant 108 changed their routing table on Jul. 5, 2012 by moving Star to the top of the routing table 602. Methods for identifying a specific date when a merchant routing table is changed will be apparent to persons having skill in the relevant art.

In embodiments where one or more network subgroups 504 of the plurality of network subgroups 502 include a third debit network 306 (e.g., or more), the processing unit 204 may apply an algorithm or use methods known in the art to identify the order of the merchant routing table 602. For example, if a network subgroup 504 includes financial transactions involving debit cards 104 with four eligible debit processors 112, such as Maestro, Interlink, Star, and Pulse, then the processing unit 204 may identify the utilized debit network 308 as having preference over the other three debit processors 112. The processing unit may decompose the relationship into multiple comparisons of two networks, such as, for example, Maestro>Interlink, Maestro>Star, and Maestro>Pulse if Maestro is the utilized debit network 308.

The processing unit 204 may then apply known rules, such as the triangle rule (e.g., if A>B and B>C, then A>C) once all relationships have been decomposed to identify the merchant routing table 602.

First Exemplary Method for Identifying a Merchant Debit Routing Table

Figure 8:
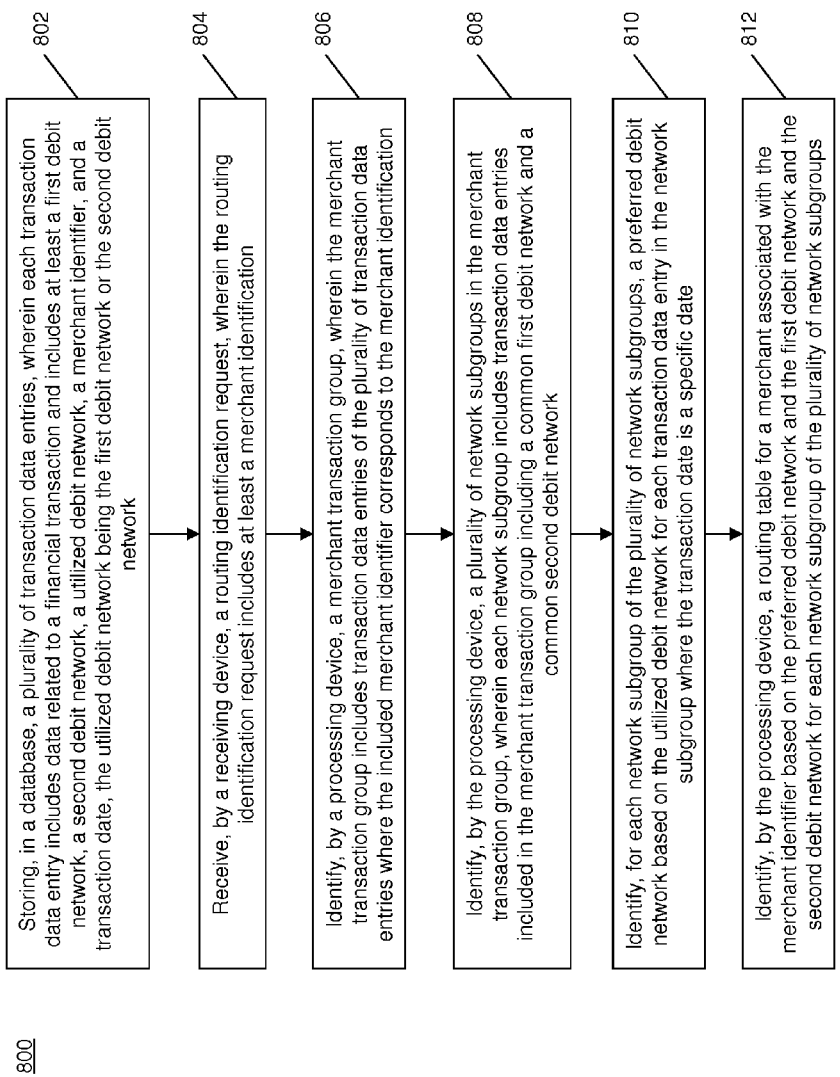
FIGS. 8 and 9 are flow charts illustrating exemplary methods for identifying merchant debit routing tables in accordance with exemplary embodiments.

FIG. 8 illustrates a first exemplary method 800 for identifying a merchant debit routing table (e.g., the routing table 602) using the system 100. In step 802, a plurality of transaction data entries (e.g., transaction data entries 120) may be stored in a database (e.g., the transaction database 118), wherein each transaction data entry 120 includes data related to a financial transaction and includes at least a first debit network (e.g., the first debit network 302), a second debit network (e.g., the second debit network 304), a utilized debit network (e.g., the utilized debit network 308), a merchant identifier (e.g., the merchant identifier 310), and a transaction date (e.g., the transaction date 312), the utilized debit network 308 being the first debit network 302 or the second debit network 304. In some embodiments, the merchant identifier 310 may be a merchant identification number (MID).

In step 804, a routing identification request may be received, by a receiving device (e.g., the receiving unit 202), wherein the routing identification request includes at least a merchant identification. In step 806, a merchant transaction group (e.g., the merchant transaction group 404) may be identified by a processing device (e.g., the processing unit 204), wherein the merchant transaction group 404 includes transaction data entries 120 of the plurality of transaction data entries 120 where the included merchant identifier 310 corresponds to the merchant identification.

In step 808, a plurality of network subgroups (e.g., the plurality of network subgroups 502) may be identified, by the processing device 204, in the merchant transaction group 404, wherein each network subgroup (e.g., the network subgroup 504) includes transaction data entries 120 included in the merchant transaction group 404 including a common first debit network 302 and a common second debit network 304. In one embodiment, each transaction data entry 120 may further include a transaction amount category (e.g., the transaction amount 312) of a plurality of transaction amount categories, and each network subgroup 504 may include transaction data entries 120 further including common transaction amount categories.

In step 810, a preferred debit network may be identified for each network subgroup 504 of the plurality of network subgroups 502 based on the utilized debit network 308 for each transaction data entry 120 in the network subgroup 504 where the transaction date 312 is a specific date. In one embodiment, the routing identification request may further include the specific date.

In step 812, a routing table (e.g., the routing table 602) may be identified, by the processing device 204, for a merchant (e.g., the merchant 108) associated with the merchant identifier 310 based on the preferred debit network and the first debit network 302 and the second debit network 304 for each network subgroup 502 of the plurality of network subgroups 504. In embodiments where each network subgroup 504 may further include a common transaction amount category, step 812 may further include identifying a routing table 602 for each transaction amount category of the plurality of transaction amount categories.

In some embodiments, at least one transaction data entry 120 may include a third debit network (e.g., the third debit network 306). In such an embodiment, identifying the plurality of network subgroups 502 may further include each network subgroup 504 including transaction data entries 120 included in the merchant transaction group 404 including a common first, second, and third debit network. Identifying a routing table 602 may also further include identifying a routing table 602 based on the preferred debit network and the first, second, and third debit networks for each network subgroup 504 of the plurality of network subgroups 502.

Second Exemplary Method for Identifying a Merchant Debit Routing Table

Figure 9:
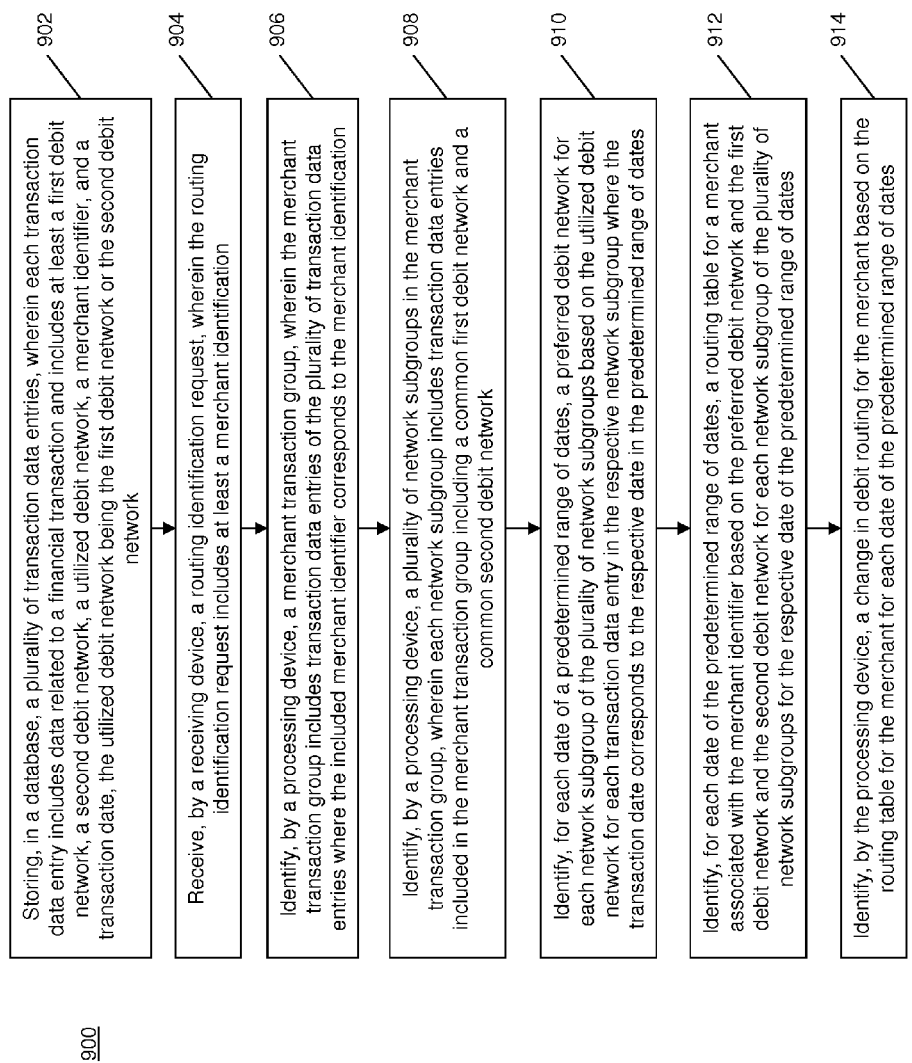

FIG. 9 illustrates a first exemplary method 900 for identifying a merchant debit routing table (e.g., the routing table 602) using the system 100.

In step 902, a plurality of transaction data entries (e.g., transaction data entries 120) may be stored in a database (e.g., the transaction database 118), wherein each transaction data entry 120 includes data related to a financial transaction and includes at least a first debit network (e.g., the first debit network 302), a second debit network (e.g., the second debit network 304), a utilized debit network (e.g., the utilized debit network 308), a merchant identifier (e.g., the merchant identifier 310), and a transaction date (e.g., the transaction date 312), the utilized debit network 308 being the first debit network 302 or the second debit network 304. In some embodiments, the merchant identifier 310 may be a merchant identification number (MID).

In step 904, a routing identification request may be received, by a receiving device (e.g., the receiving unit 202), wherein the routing identification request includes at least a merchant identification. In step 806, a merchant transaction group (e.g., the merchant transaction group 404) may be identified by a processing device (e.g., the processing unit 204), wherein the merchant transaction group 404 includes transaction data entries 120 of the plurality of transaction data entries 120 where the included merchant identifier 310 corresponds to the merchant identification.

In step 908, a plurality of network subgroups (e.g., the plurality of network subgroups 502) may be identified, by the processing device 204, in the merchant transaction group 404, wherein each network subgroup (e.g., the network subgroup 504) includes transaction data entries 120 included in the merchant transaction group 404 including a common first debit network 302 and a common second debit network 304. In one embodiment, each transaction data entry 120 may further include a transaction amount category (e.g., the transaction amount 312) of a plurality of transaction amount categories, and each network subgroup 504 may include transaction data entries 120 further including common transaction amount categories.

In step 910, a preferred debit network may be identified for each network subgroup 504 of the plurality of network subgroups 502 for each date of a predetermined range of dates, based on the utilized debit network 308 for each transaction data entry 120 in the network subgroup 504 where the transaction date 312 corresponds to the respective date in the predetermined range of dates. In some embodiments, the routing identification request may further include the predetermined range of dates.

In step 912, a routing table (e.g., the routing table 602) may be identified, by the processing device 204, for a merchant (e.g., the merchant 108) associated with the merchant identifier 310 for each date of the predetermined range of dates, based on the preferred debit network and the first debit network 302 and the second debit network 304 for each network subgroup 502 of the plurality of network subgroups 504 for the respective date of the predetermined range of dates. In embodiments where each network subgroup 504 may further include a common transaction amount category, step 912 may further include identifying a routing table 602 for each transaction amount category of the plurality of transaction amount categories.

In step 914, a change in debit routing for the merchant 108 may be identified, by the processing device 204, based on the routing table 602 for the merchant 108 for each date of the predetermined range of dates. In some embodiments, at least one transaction data entry 120 may include a third debit network (e.g., the third debit network 306). In such an embodiment, identifying the plurality of network subgroups 502 may further include each network subgroup 504 including transaction data entries 120 included in the merchant transaction group 404 including a common first, second, and third debit network. Identifying a routing table 602 may also further include identifying a routing table 602 based on the preferred debit network and the first, second, and third debit networks for each network subgroup 504 of the plurality of network subgroups 502.

Computer System Architecture

Figure 10:
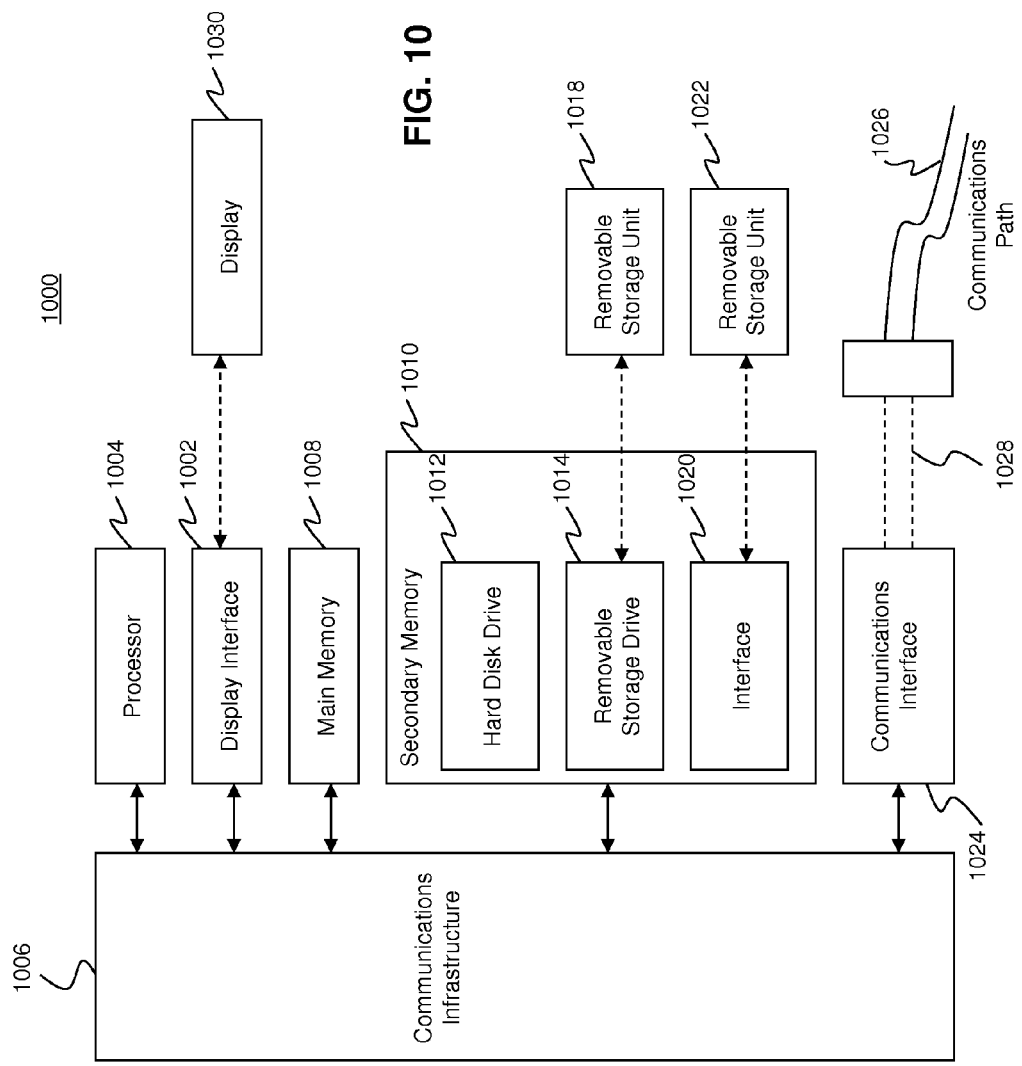
FIG. 10 is a block diagram illustrating computer system architecture in accordance with exemplary embodiments.

FIG. 10 illustrates a computer system 1000 in which embodiments of the present disclosure, or portions thereof, may be implemented as computer-readable code. For example, the issuer 106, the merchant 108, the debit processors 112, and the processing server 114 of FIG. 1 may be implemented in the computer system 1000 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 8 and 9.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, mini-computers, mainframe computers, computers linked or clustered with distributed functions, as well as pervasive or miniature computers that may be embedded into virtually any device. For instance, at least one processor device and a memory may be used to implement the above described embodiments.

A processor device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1018, a removable storage unit 1022, and a hard disk installed in hard disk drive 1012.

Various embodiments of the present disclosure are described in terms of this example computer system 1000. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 1004 may be a special purpose or a general purpose processor device. The processor device 1004 may be connected to a communication infrastructure 1006, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 1000 may also include a main memory 1008 (e.g., random access memory, read-only memory, etc.), and may also include a secondary memory 1010. The secondary memory 1010 may include the hard disk drive 1012 and a removable storage drive 1014, such as a floppy disk drive, a magnetic tape drive, an optical disk drive, a flash memory, etc.

The removable storage drive 1014 may read from and/or write to the removable storage unit 1018 in a well-known manner. The removable storage unit 1018 may include a removable storage media that may be read by and written to by the removable storage drive 1014. For example, if the removable storage drive 1014 is a floppy disk drive, the removable storage unit 1018 may be a floppy disk. In one embodiment, the removable storage unit 1018 may be non-transitory computer readable recording media.

In some embodiments, the secondary memory 1010 may include alternative means for allowing computer programs or other instructions to be loaded into the computer system 1000, for example, the removable storage unit 1022 and an interface 1020. Examples of such means may include a program cartridge and cartridge interface (e.g., as found in video game systems), a removable memory chip (e.g., EEPROM, PROM, etc.) and associated socket, and other removable storage units 1022 and interfaces 1020 as will be apparent to persons having skill in the relevant art.

Data stored in the computer system 1000 (e.g., in the main memory 1008 and/or the secondary memory 1010) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1000 may also include a communications interface 1024. The communications interface 1024 may be configured to allow software and data to be transferred between the computer system 1000 and external devices. Exemplary communications interfaces 1024 may include a modem, a network interface (e.g., an Ethernet card), a communications port, a PCMCIA slot and card, etc. Software and data transferred via the communications interface 1024 may be in the form of signals, which may be electronic, electromagnetic, optical, or other signals as will be apparent to persons having skill in the relevant art. The signals may travel via a communications path 1026, which may be configured to carry the signals and may be implemented using wire, cable, fiber optics, a phone line, a cellular phone link, a radio frequency link, etc.

Computer program medium and computer usable medium may refer to memories, such as the main memory 1008 and secondary memory 1010, which may be memory semiconductors (e.g. DRAMs, etc.). These computer program products may be means for providing software to the computer system 1000. Computer programs (e.g., computer control logic) may be stored in the main memory 1008 and/or the secondary memory 1010. Computer programs may also be received via the communications interface 1024. Such computer programs, when executed, may enable computer system 1000 to implement the present methods as discussed herein. In particular, the computer programs, when executed, may enable processor device 1004 to implement the methods illustrated by FIGS. 8 and 9, as discussed herein. Accordingly, such computer programs may represent controllers of the computer system 1000. Where the present disclosure is implemented using software, the software may be stored in a computer program product and loaded into the computer system 1000 using the removable storage drive 1014, interface 1020, and hard disk drive 1012, or communications interface 1024.

Techniques consistent with the present disclosure provide, among other features, systems and methods for the identification of merchant debit routing tables. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for identifying a merchant debit routing table, comprising:
    storing, in a database, a plurality of transaction data entries, wherein each transaction data entry includes data related to a financial transaction and includes at least a first debit network, a second debit network, a utilized debit network, a merchant identifier, and a transaction date, the utilized debit network being the first debit network or the second debit network;
    receiving, by a receiving device, a routing identification request, wherein the routing identification request includes at least a merchant identification;
    identifying, by a processing device, a merchant transaction group, wherein the merchant transaction group includes transaction data entries of the plurality of transaction data entries where the included merchant identifier corresponds to the merchant identification;
    identifying, by the processing device, a plurality of network subgroups in the merchant transaction group, wherein each network subgroup includes transaction data entries included in the merchant transaction group including a common first debit network and a common second debit network;
    identifying, for each network subgroup of the plurality of network subgroups, a preferred debit network based on the utilized debit network for each transaction data entry in the network subgroup where the transaction date is a specific date; and
    identifying, by the processing device, a routing table or a merchant associated with the merchant identifier based on the preferred debit network and the first debit network and the second debit network for each network subgroup of the plurality of network subgroups.

2. The method of claim 1, wherein the routing identification request further includes the specific date.

3. The method of claim 1, wherein the merchant identifier is a merchant identification number (MID).

4. The method of claim 1, wherein
    each transaction data entry further includes a transaction amount category of a plurality of transaction amount categories, and
    identifying a plurality of network subgroups further includes identifying a plurality network subgroups where each network subgroup includes transaction data entries included in the merchant transaction group including a common first debit network, a common second debit network, and a common transaction amount category.

5. The method of claim 4, wherein identifying a routing table includes identifying a routing table for the merchant associated with the merchant identifier for each transaction amount category of the plurality of transaction amount categories.

6. The method of claim 1, wherein
    each transaction data entry further includes a third debit network,
    identifying a plurality of network subgroups further includes identifying a plurality network subgroups where each network subgroup includes transaction data entries included in the merchant transaction group including a common first debit network, a common second debit network, and a common third debit network, and
    identifying a routing table includes identifying a routing table based on the preferred debit network and the first debit network, the second debit network, and the third debit network for each network subgroup of the plurality of network subgroups.

7. A method for identifying a change in a merchant routing table, comprising:
    storing, in a database, a plurality of transaction data entries, wherein each transaction data entry includes data related to a financial transaction and includes at least a first debit network, a second debit network, a utilized debit network, a merchant identifier, and a transaction date, the utilized debit network being the first debit network or the second debit network;
    receiving, by a receiving device, a routing identification request, wherein the routing identification request includes at least a merchant identification;
    identifying, by a processing device, a merchant transaction group, wherein the merchant transaction group includes transaction data entries of the plurality of transaction data entries where the included merchant identifier corresponds to the merchant identification;
    identifying, by the processing device, a plurality of network subgroups in the merchant transaction group, wherein each network subgroup includes transaction data entries included in the merchant transaction group including a common first debit network and a common second debit network;
    identifying, for each date of a predetermined range of dates, a preferred debit network for each network subgroup of the plurality of network subgroups based on the utilized debit network for each transaction data entry in the respective network subgroup where the transaction date corresponds to the respective date in the predetermined range of dates;
    identifying, for each date of the predetermined range of dates, a routing table for a merchant associated with the merchant identifier based on the preferred debit network and the first debit network and the second debit network for each network subgroup of the plurality of network subgroups for the respective date of the predetermined range of dates; and identifying, by the processing device, a change in debit routing for the merchant based on the routing table for the merchant for each date of the predetermined range of dates.

8. The method of claim 7, wherein the routing identification request further includes the predetermined range of dates.

9. The method of claim 7, wherein the merchant identifier is a merchant identification number (MID).

10. The method of claim 7, wherein
each transaction data entry further includes a transaction amount category of a plurality of transaction amount categories, and
identifying a plurality of network subgroups further includes identifying a plurality network subgroups where each network subgroup includes transaction data entries included in the merchant transaction group including a common first debit network, a common second debit network, and a common transaction amount category.

11. The method of claim 10, wherein identifying a routing table includes identifying a routing table for the merchant associated with the merchant identifier for each transaction amount category of the plurality of transaction amount categories.

12. The method of claim 11, wherein identifying a change in debit routing for the merchant includes identifying a change in debit routing for the merchant 108 based on the routing table for the merchant for each transaction amount category of the plurality of transaction amount categories for each date of the predetermined range of dates.

13. The method of claim 7, wherein
each transaction data entry further includes a third debit network,
identifying a plurality of network subgroups further includes identifying a plurality network subgroups where each network subgroup includes transaction data entries included in the merchant transaction group including a common first debit network, a common second debit network, and a common third debit network, and
identifying a routing table includes identifying a routing table based on the preferred debit network and the first debit network, the second debit network, and the third debit network for each network subgroup of the plurality of network subgroups.

14. A system for identifying a merchant debit routing table, comprising:
a database configured to store a plurality of transaction data entries, wherein each transaction data entry includes data related to a financial transaction and includes at least a first debit network, a second debit network, a utilized debit network, a merchant identifier, and a transaction date, the utilized debit network being the first debit network or the second debit network;
a receiving device configured to receive a routing identification request, wherein the routing identification request includes at least a merchant identification; and
a processing device configured to
identify a merchant transaction group, wherein the merchant transaction group includes transaction data entries of the plurality of transaction data entries where the included merchant identifier corresponds to the merchant identification,
identify a plurality of network subgroups in the merchant transaction group, wherein each network subgroup includes transaction data entries included in the merchant transaction group including a common first debit network and a common second debit network,
identify, for each network subgroup of the plurality of network subgroups, a preferred debit network based on the utilized debit network for each transaction data entry in the network subgroup where the transaction date is a specific date, and
identify a routing table for a merchant associated with the merchant identifier based on the preferred debit network and the first debit network and the second debit network for each network subgroup of the plurality of network subgroups.

15. The system of claim 14, wherein the routing identification request further includes the specific date.

16. The system of claim 14, wherein the merchant identifier is a merchant identification number (MID).

17. The system of claim 14, wherein
each transaction data entry further includes a transaction amount category of a plurality of transaction amount categories, and
identifying a plurality of network subgroups further includes identifying a plurality network subgroups where each network subgroup includes transaction data entries included in the merchant transaction group including a common first debit network, a common second debit network, and a common transaction amount category.

18. The system of claim 14, wherein identifying a routing table includes identifying a routing table for the merchant associated with the merchant identifier for each transaction amount category of the plurality of transaction amount categories.

19. The system of claim 14, wherein
each transaction data entry further includes a third debit network,
identifying a plurality of network subgroups further includes identifying a plurality network subgroups where each network subgroup includes transaction data entries included in the merchant transaction group including a common first debit network, a common second debit network, and a common third debit network, and
identifying a routing table includes identifying a routing table based on the preferred debit network and the first debit network, the second debit network, and the third debit network for each network subgroup of the plurality of network subgroups.

20. A system for identifying a change in a merchant routing table, comprising:
a database configured to store a plurality of transaction data entries, wherein each transaction data entry includes data related to a financial transaction and includes at least a first debit network, a second debit network, a utilized debit network, a merchant identifier, and a transaction date, the utilized debit network being the first debit network or the second debit network;
a receiving device configured to receive a routing identification request, wherein the routing identification request includes at least a merchant identification; and
a processing device configured to
identify a merchant transaction group, wherein the merchant transaction group includes transaction data entries of the plurality of transaction data entries where the included merchant identifier corresponds to the merchant identification,
identify a plurality of network subgroups in the merchant transaction group, wherein each network subgroup includes transaction data entries included in the merchant transaction group including a common first debit network and a common second debit network, identify, for each date of a predetermined range of dates, a preferred debit network for each network subgroup of the plurality of network subgroups based on the utilized debit network for each transaction data entry in the respective network subgroup where the transaction date corresponds to the respective date in the predetermined range of dates, identify, for each date of the predetermined range of dates, a routing table for a merchant associated with the merchant identifier based on the preferred debit network and the first debit network and the second debit network for each network subgroup of the plurality of network subgroups for the respective date of the predetermined range of dates, and identify a change in debit routing for the merchant based on the routing table for the merchant for each date of the predetermined range of dates.

21. The system of claim 20, wherein the routing identification request further includes the predetermined range of dates.

22. The system of claim 20, wherein the merchant identifier is a merchant identification number (MID).

23. The system of claim 20, wherein each transaction data entry further includes a transaction amount category of a plurality of transaction amount categories, and identifying a plurality of network subgroups further includes identifying a plurality network subgroups where each network subgroup includes transaction data entries included in the merchant transaction group including a common first debit network, a common second debit network, and a common transaction amount category.

24. The system of claim 23, wherein identifying a routing table includes identifying a routing table for the merchant associated with the merchant identifier for each transaction amount category of the plurality of transaction amount categories.

25. The system of claim 24, wherein identifying a change in debit routing for the merchant includes identifying a change in debit routing for the merchant based on the routing table for the merchant for each transaction amount category of the plurality of transaction amount categories for each date of the predetermined range of dates.

26. The system of claim 20, wherein each transaction data entry further includes a third debit network, identifying a plurality of network subgroups further includes identifying a plurality network subgroups where each network subgroup includes transaction data entries included in the merchant transaction group including a common first debit network, a common second debit network, and a common third debit network, and identifying a routing table includes identifying a routing table based on the preferred debit network and the first debit network, the second debit network, and the third debit network for each network subgroup of the plurality of network subgroups.

* * * * *